US012578633B2

(12) United States Patent
Sakata et al.

(10) Patent No.: US 12,578,633 B2
(45) Date of Patent: Mar. 17, 2026

(54) LIGHT SOURCE APPARATUS AND PROJECTOR

(71) Applicant: SEIKO EPSON CORPORATION, Tokyo (JP)

(72) Inventors: Hidefumi Sakata, Azumino (JP); Mizuha Hiroki, Nagano-Ken (JP)

(73) Assignee: SEIKO EPSON CORPORATION, Tokyo (JP)

( * ) Notice: Subject to any disclaimer, the term of this patent is extended or adjusted under 35 U.S.C. 154(b) by 500 days.

(21) Appl. No.: 18/153,649

(22) Filed: Jan. 12, 2023

(65) Prior Publication Data

US 2023/0221628 A1 Jul. 13, 2023

(30) Foreign Application Priority Data

Jan. 12, 2022 (JP) ................................. 2022-003159

(51) Int. Cl.
*G03B 21/20* (2006.01)

(52) U.S. Cl.
CPC ....... *G03B 21/204* (2013.01); *G03B 21/2066* (2013.01)

(58) Field of Classification Search
None
See application file for complete search history.

(56) References Cited

U.S. PATENT DOCUMENTS 10,920,939 B2 2/2021 Haenen et al.
2008/0079910 A1 * 4/2008 Rutherford .......... G02B 6/0003
353/84

FOREIGN PATENT DOCUMENTS

JP 2005-070443 A 3/2005
JP 2005115071 A * 4/2005 ......... G02B 27/1046
JP 2005292283 A * 10/2005
JP 2006-208864 A 8/2006
JP 2015-040892 A 3/2015
JP 2020-526877 A 8/2020
JP 2021-149021 A 9/2021

* cited by examiner

*Primary Examiner* — Bao-Luan Q Le
*Assistant Examiner* — Danell L Owens
(74) *Attorney, Agent, or Firm* — Dority & Manning, P.A.

(57) ABSTRACT

A light source apparatus according to an aspect of the present disclosure includes a light emitter that outputs first light, a wavelength conversion member that converts the first light into second light, an output section that outputs the second light, and a light collection member. The output section includes a first end section that faces the wavelength conversion member, a second end section that is located at the side opposite from the first end section along a center axis, and a tapering section that has a cross-sectional area that is perpendicular to the center axis and gradually decreases from the first end section toward the second end section, and the tapering section has a light output surface which inclines with respect to the center axis and via which the second light exits. The light collection member includes a third end section that is relatively close to the wavelength conversion member, a fourth end section that is located at the side opposite from the third end section, and a reflection surface that faces the light output surface and reflects the second light. At least a portion of the reflection surface of the light collection member, the portion facing the fourth end section, is separate from the light output surface at the side facing the second end section of the output section.

18 Claims, 7 Drawing Sheets

LIGHT SOURCE APPARATUS AND PROJECTOR

The present application is based on, and claims priority from JP Application Serial Number 2022-003159, filed Jan. 12, 2022, the disclosure of which is hereby incorporated by reference herein in its entirety.

BACKGROUND

1. Technical Field

The present disclosure relates to a light source apparatus and a projector.

2. Related Art

As a light source apparatus used in a projector, there has been a proposed light source apparatus using fluorescence emitted from a phosphor when the phosphor is irradiated with excitation light outputted from a light emitter.

JP-T-2020-526877 discloses a light source apparatus including a solid-state light source that emits blue light and a rod-shaped wavelength conversion member containing a phosphor that converts the blue light in terms of wavelength. JP-T-2020-526877 states that the efficiency of the light source apparatus is improved by processing an end portion of the wavelength conversion member, which has a quadrangular columnar shape, into a quadrangular pyramidal shape.

In the light source apparatus disclosed in JP-T-2020-526877, however, even when fluorescence generated by the wavelength conversion member can be efficiently extracted, part of the fluorescence exits in directions different from a direction in which the fluorescence should originally exit. Optical instruments that use the fluorescence, such as projectors, therefore, have a problem of low fluorescence utilization efficiency in an optical system downstream from the light source apparatus.

SUMMARY

To solve the problem described above, a light source apparatus according to an aspect of the present disclosure includes a light emitter that outputs first light having a first wavelength band, a wavelength conversion member that includes a phosphor and converts the first light outputted from the light emitter into second light having a second wavelength band different from the first wavelength band, an output section that is provided along a center axis of the wavelength conversion member and outputs the second light generated by the wavelength conversion member, and a light collection member that reflects the second light outputted from the output section to change a traveling direction of the second light from a direction away from the center axis to a direction close to the center axis. The output section includes a first end section that faces the wavelength conversion member, a second end section that is located at a side opposite from the first end section along the center axis, and a tapering section that has a cross-sectional area that is perpendicular to the center axis and gradually decreases from the first end section toward the second end section, and the tapering section has a light output surface which inclines with respect to the center axis and via which the second light exits. The light collection member includes a third end section that is relatively close to the wavelength conversion member, a fourth end section that is located at a side opposite from the third end section, and a reflection surface that faces the light output surface and reflects the second light. At least a portion of the reflection surface of the light collection member, the portion facing the fourth end section, is separate from the light output surface at a side facing the second end section of the output section.

A projector according to another aspect of the present disclosure includes the light source apparatus according to the aspect of the present disclosure, a light modulator that modulates light outputted from the light source apparatus and containing the second light in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to FIGS. 1 to 3.

A projector according to the present embodiment is an example of a projector using liquid crystal panels as a light modulator.

In the following drawings, components are drawn at different dimensional scales in some cases for clarification of each of the components.

Figure 1:
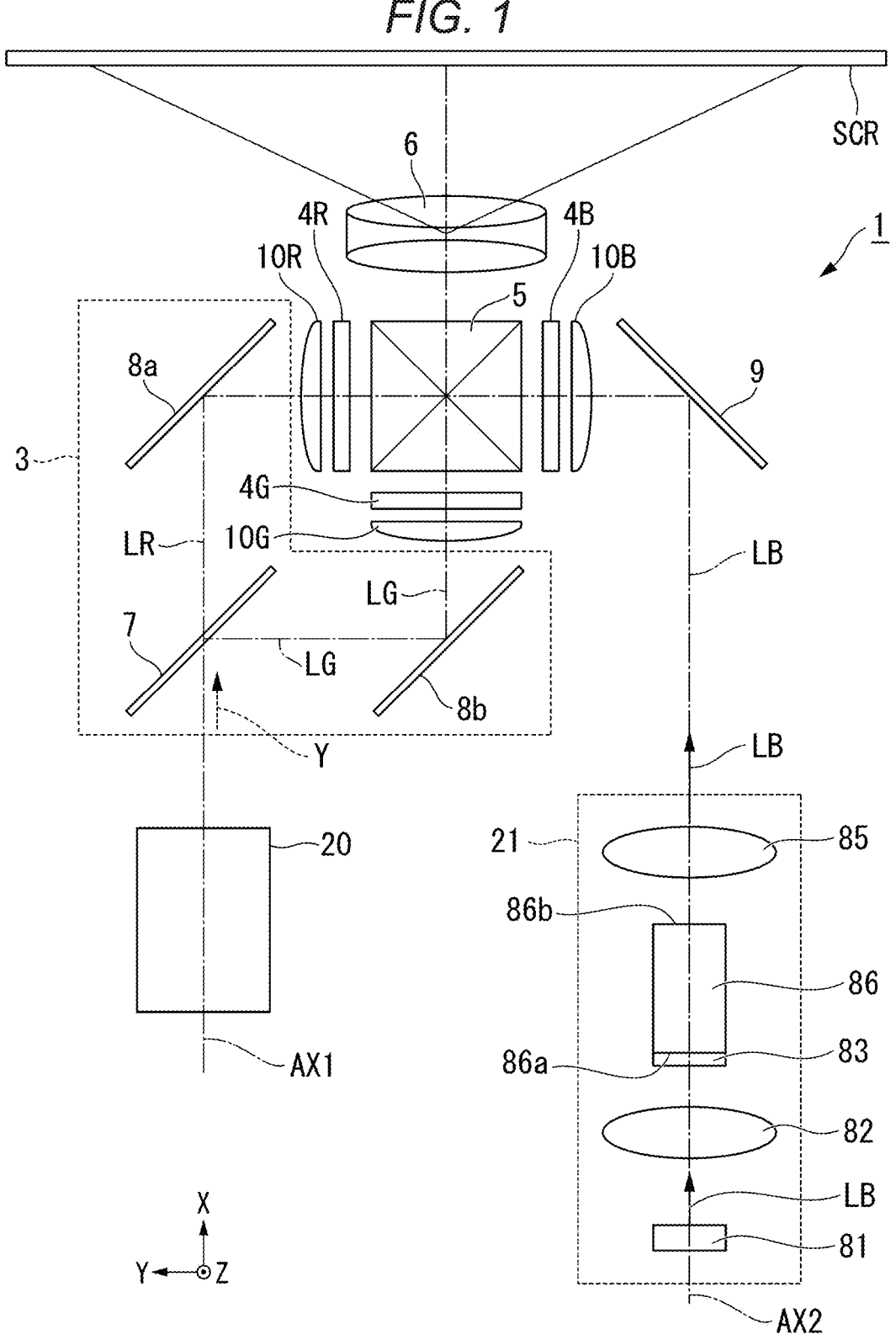
FIG. 1 is a schematic configuration diagram of a projector in a first embodiment.

FIG. 1 shows a schematic configuration of a projector 1 according to the present embodiment.

The projector 1 according to the present embodiment is a projection-type image display apparatus that displays a color image on a screen (projection receiving surface) SCR, as shown in FIG. 1. The projector 1 includes three light modulators corresponding to three types of color light, red light LR, green light LG, and blue light LB.

The projector 1 includes a first illuminator 20, a second illuminator 21, a color separation system 3, light modulators 4R, 4G, and 4B, a light combiner 5, and a projection optical apparatus 6.

The first illuminator 20 outputs yellow fluorescence Y toward the color separation system 3. The second illuminator 21 outputs blue light LB toward the light modulator 4B. Detailed configurations of the first illuminator 20 and the second illuminator 21 will be described later.

The following description with reference to the drawings will be made by using an XYZ orthogonal coordinate system as required. The axis Z is an axis extending along the upward-downward direction of the projector 1. The axis X is an axis parallel to an optical axis AX1 of the first illuminator 20 and an optical axis AX2 of the second illuminator 21. The axis Y is an axis perpendicular to the axes X and Z. The optical axis AX1 of the first illuminator 20 is the center axis of the fluorescence Y outputted from the first illuminator 20. The optical axis AX2 of the second illuminator 21 is the center axis of the blue light LB outputted from the second illuminator 21.

The color separation system 3 separates the yellow fluorescence Y outputted from the first illuminator 20 into the red light LR and the green light LG. The color separation system 3 includes a dichroic mirror 7, a first reflection mirror 8a, and a second reflection mirror 8b.

The dichroic mirror 7 separates the fluorescence Y into the red light LR and the green light LG. The dichroic mirror 7 transmits the red light LR and reflects the green light LG. The second reflection mirror 8b is disposed in the optical path of the green light LG. The second reflection mirror 8b reflects the green light LG reflected off the dichroic mirror 7 toward the light modulator 4G. The first reflection mirror 8a is disposed in the optical path of the red light LR. The first reflection mirror 8a reflects the red light LR having passed through the dichroic mirror 7 toward the light modulator 4R.

On the other hand, the blue light LB outputted from the second illuminator 21 is reflected off a reflection mirror 9 toward the light modulator 4B.

The configuration of the second illuminator 21 will be described below.

The second illuminator 21 includes a light source section 81, a focusing lens 82, a diffuser plate 83, a rod lens 86, and a relay lens 85. The light source section 81 is formed of at least one semiconductor laser. The light source section 81 outputs the blue light LB formed of laser light. The light source section 81 is not necessarily formed of a semiconductor laser and may be formed of an LED that outputs blue light.

The focusing lens 82 is formed of a convex lens. The focusing lens 82 causes the blue light LB outputted from the light source section 81 to be incident on the diffuser plate 83 with the blue light LB substantially focused thereon. The diffuser plate 83 diffuses the blue light LB having exited out of the focusing lens 82 into blue light LB diffused by a predetermined degree to generate blue light LB having a substantially uniform light orientation distribution similar to that of the fluorescence Y outputted from the first illuminator 20. The diffuser plate 83 is, for example, a ground glass plate made of optical glass.

The blue light LB diffused by the diffuser plate 83 enters the rod lens 86. The rod lens 86 has a quadrangular columnar shape extending along the optical axis AX2 of the second illuminator 21. The rod lens 86 has one end that is a light incident end surface 86a and the other end that is a light exiting end surface 86b. The diffuser plate 83 is fixed to the light incident end surface 86a of the rod lens 86 via an optical adhesive (not shown). It is desirable that the refractive index of the diffuser plate 83 matches as much as possible with the refractive index of the rod lens 86.

The blue light LB propagates through the interior of the rod lens 86 while being totally reflected therein and exits via the light exiting end surface 86b with the illuminance distribution uniformity of the blue light LB increased. The blue light LB having exited out of the rod lens 86 enters the relay lens 85. The relay lens 85 causes the blue light LB having the illuminance distribution uniformity increased by the rod lens 86 to be incident on the reflection mirror 9.

The light exiting end surface 86b of the rod lens 86 has a rectangular shape substantially similar to the shape of an image formation region of the light modulator 4B. The blue light LB having exited out of the rod lens 86 is thus efficiently incident on the image formation region of the light modulator 4B.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each, for example, a transmissive liquid crystal panel. Polarizers (not shown) are disposed on the light incident and exiting sides of each of the liquid crystal panels. The polarizers each transmit only linearly polarized light polarized in a specific direction.

A field lens 10R is disposed at the light incident side of the light modulator 4R. A field lens 10G is disposed at the light incident side of the light modulator 4G. A field lens 10B is disposed at the light incident side of the light modulator 4B. The field lens 10R parallelizes the chief ray of the red light LR to be incident on the light modulator 4R. The field lens 10G parallelizes the chief ray of the green light LG to be incident on the light modulator 4G. The field lens 10B parallelizes the chief ray of the blue light LB to be incident on the light modulator 4B.

The light combiner 5 receives the image light outputted from the light modulator 4R, the image light outputted from the light modulator 4G, and the image light outputted from the light modulator 4B, combines the image light corresponding to the red light LR, the image light corresponding to the green light LG, and the image light corresponding to the blue light LB with one another, and outputs the combined image light toward the projection optical apparatus 6. The light combiner 5 is, for example, a cross dichroic prism.

The projection optical apparatus 6 is formed of a plurality of projection lenses. The projection optical apparatus 6 enlarges the combined image light from the light combiner 5 and projects the enlarged image light toward the screen SCR. An image is thus displayed on the screen SCR.

The configuration of the first illuminator 20 will be described below.

Figure 2:
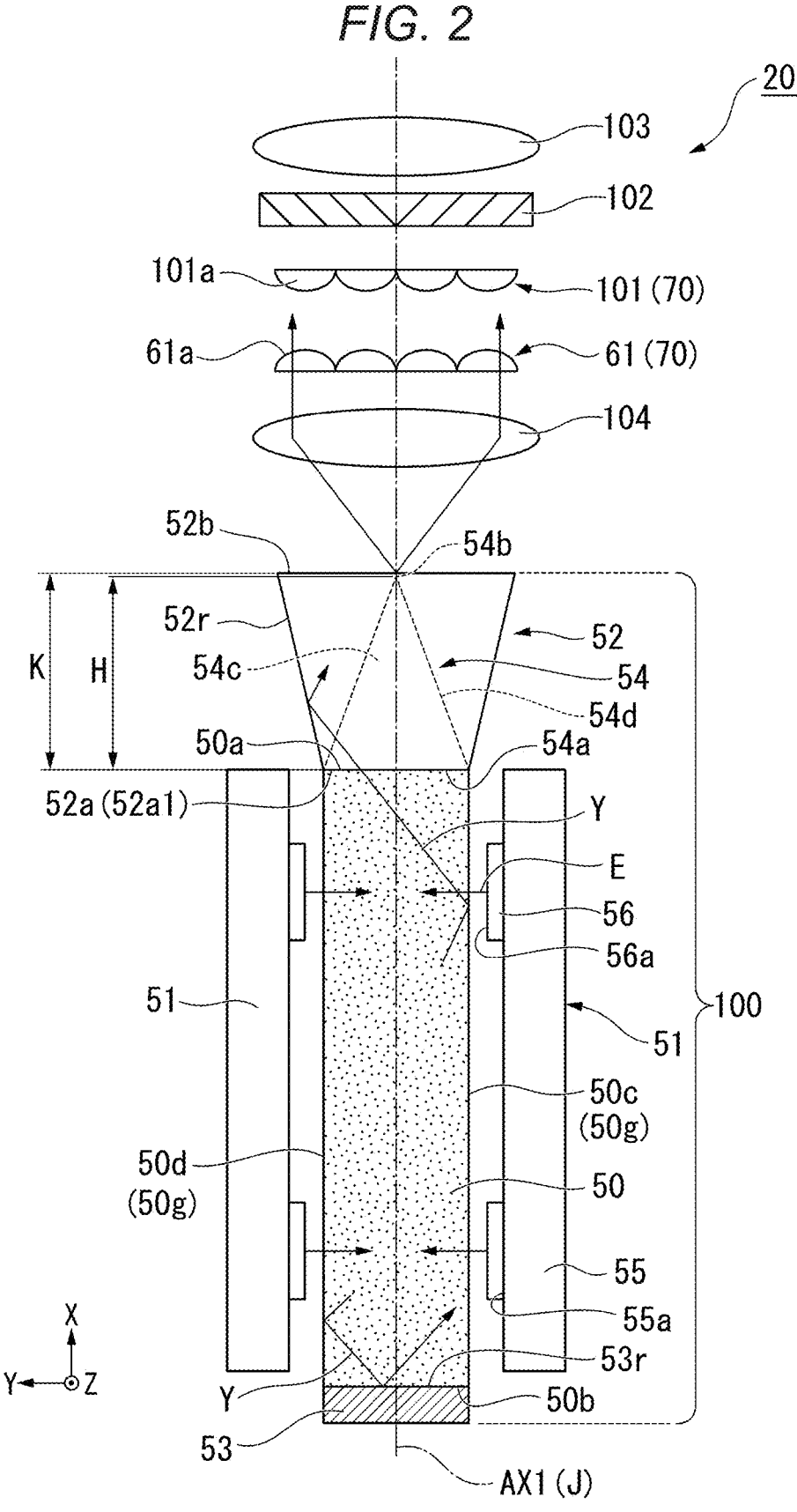
FIG. 2 is a schematic configuration diagram of a first illuminator in the first embodiment.

FIG. 2 is a schematic configuration diagram of the first illuminator 20. FIG. 3 is a perspective view of key parts of a light source apparatus 100.

The first illuminator 20 includes the light source apparatus 100, an optical integration system 70, a polarization converter 102, a superimposing system 103, and a light collection lens 104, as shown in FIG. 2.

Figure 3:
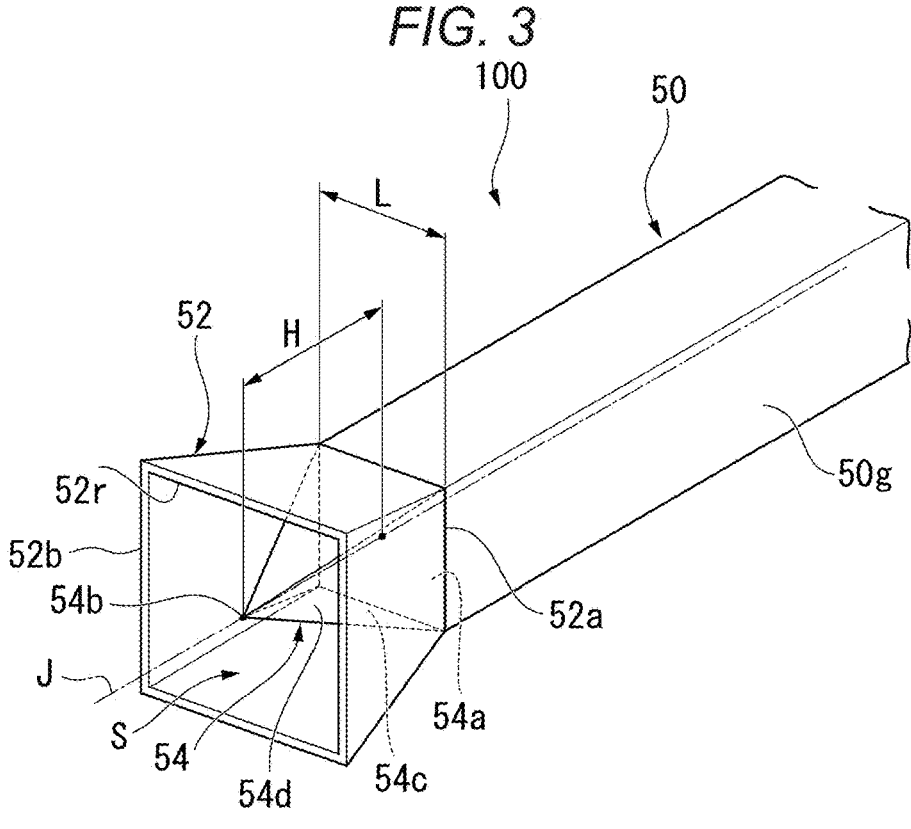
FIG. 3 is a perspective view of key parts of a light source apparatus.

The light source apparatus 100 includes a wavelength conversion member 50, a light source section 51, a reflection member 53, an output section 54, a light collection member 52, and a support member 57 (see FIGS. 4 and 5), as shown in FIGS. 2 and 3. The light source section 51 includes a substrate 55 and light emitters 56. In FIGS. 2 and 3, the support member 57 is omitted.

The wavelength conversion member 50 has a quadrangular columnar shape extending in the axis-X direction and has six surfaces. The sides of the wavelength conversion member 50 that extend in the axis-X direction are longer than the sides of the wavelength conversion member 50 that extend in the axis-Y direction and the sides thereof that extend in the axis-Z direction. The axis-X direction therefore corresponds to the longitudinal direction of the wavelength conversion member 50. The length of the sides extending in the axis-Y direction is equal to the length of the sides extending in the axis-Z direction. That is, the wavelength conversion member 50 has a square cross-sectional shape taken along a plane perpendicular to the axis-X direction. The wavelength conversion member 50 may instead have an oblong cross-sectional shape taken along a plane perpendicular to the axis-X direction.

The wavelength conversion member 50 has a first surface 50*a*, which intersects with the longitudinal direction (axis-X direction) of the wavelength conversion member 50 and where the output section 54 is provided, a second surface 50*b*, which intersects with the longitudinal direction (axis-X direction) of the wavelength conversion member 50 and is located at the side opposite from the first surface 50*a*, a first side surface 50*c* and a second side surface 50*d*, which intersect with the first surface 50*a* and the second surface 50*b* and are located at the sides opposite from each other, and a third side surface and a fourth side surface (not shown), which intersect with the first side surface 50*c* and the second side surface 50*d* and are located at the sides opposite from each other. In the following description, the four side surfaces described above, the first side surface 50*c*, the second side surface 50*d*, the third side surface, and the fourth side surface are collectively referred to as side surfaces 50*g*.

An axis passing through the center of the first surface 50*a* and the center of the second surface 50*b* of the wavelength conversion member 50 and parallel to the axis X is defined as a center axis J of the wavelength conversion member 50. The center axis J of the wavelength conversion member 50 coincides with the optical axis AX1 of the first illuminator 20.

In the present embodiment, in which the wavelength conversion member 50 and the output section 54 are integrated with each other into a single member, as will be described below, the first surface 50*a* out of the six surfaces described above is not a surface that actually exists but is defined as an imaginary surface that defines the boundary between the wavelength conversion member 50 and the output section 54. The wavelength conversion member 50 does not necessarily have a quadrangular columnar shape and may instead have, for example, a triangular or circular columnar shape. When the wavelength conversion member 50 has a triangular columnar shape, the three surfaces that intersect with the first and second surfaces are collectively referred to as the side surfaces 50*g*. When the wavelength conversion member 50 has a circular columnar shape, the single curved surface that intersects with the first and second surfaces is referred to as the side surface 50*g*.

The wavelength conversion member 50 at least contains a phosphor and converts excitation light E having a first wavelength band into the fluorescence Y having a second wavelength band different from the first wavelength band. In the present embodiment, the excitation light E enters the wavelength conversion member 50 via the first side surface 50*c* and the second side surface 50*d*. The fluorescence Y is guided through the interior of the wavelength conversion member 50, then enters the output section 54, and exits out of the output section 54. The excitation light E in the present embodiment corresponds to the first light in the claims. The fluorescence Y in the present embodiment corresponds to the second light in the claims.

The wavelength conversion member 50 contains a ceramic phosphor formed of a polycrystal phosphor that converts the excitation light E in terms of wavelength into the fluorescence Y. The second wavelength band of the fluorescence Y is, for example, a yellow wavelength band ranging from 490 to 750 nm. That is, the fluorescence Y is yellow fluorescence containing a red light component and a green light component.

The wavelength conversion member 50 may contain a single crystal phosphor in place of a polycrystal phosphor. The wavelength conversion member 50 may instead be made of fluorescent glass. Still instead, the wavelength conversion member 50 may be formed of a binder which is made of glass or resin and in which a large number of phosphor particles are dispersed. The wavelength conversion member 50 made of any of the materials described above converts the excitation light E into the fluorescence Y having the second wavelength band.

Specifically, the material of the wavelength conversion member 50 contains, for example, an yttrium-aluminum-garnet-based (YAG-based) phosphor. Consider YAG:Ce, which contains cerium (Ce) as an activator by way of example, and the wavelength conversion member 50 is made, for example, of a material produced by mixing raw powder materials containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The light source section 51 includes the light emitters 56 each having a light emitting surface 56*a*, via which the excitation light E having the first wavelength band exits. The light source section 51 is provided so as to face the first side surface 50*c* and the second side surface 50*d* of the wavelength conversion member 50. The light emitters 56 are each formed, for example, of a light emitting diode (LED). The light source section 51 is thus provided so as to face part of the side surfaces 50*g*, which extend along the longitudinal direction of the wavelength conversion member 50. The number of light source sections 51 is not limited to a specific number, and the arrangement of the light source sections 51 is not limited to a specific arrangement.

The light emitting surface 56*a* of each of the light emitters 56 is disposed so as to face the first side surface 50*c* or the second side surface 50*d* of the wavelength conversion member 50, and the excitation light E exits via each of the light emitting surfaces 56*a* toward the first side surface 50*c* or the second side surface 50*d*. The first wavelength band is, for example, a blue-violet wavelength band ranging from 400 to 480 nm and has a peak wavelength of, for example, 445 nm.

The substrate 55 supports the light emitters 56. A plurality of light emitters 56 are provided at one surface 55*a* of the substrate 55. In the present embodiment, the light source section 51 is formed of the light emitters 56 and the substrate 55 and may further include a light guiding plate, a diffuser plate, a lens, and other optical members. The number of light emitters 56 provided at the substrate 55 is not limited to a specific number.

The reflection member 53 is provided so as to face the second surface 50*b* of the wavelength conversion member 50. The reflection member 53 reflects the fluorescence Y having been guided through the interior of the wavelength conversion member 50 and having reached the second surface 50b. The reflection member 53 is a member separate from the wavelength conversion member 50 and is formed, for example, of a plate-shaped member made of a metal material such as aluminum. The reflection member 53 faces the second surface 50b of the wavelength conversion member 50 and has a reflection surface 53r, which reflects the fluorescence Y. The reflection surface 53r may instead be the surface of the metal material itself or may still instead be formed of a metal film or a dielectric multilayer film formed at the surface of the metal material.

In the light source apparatus 100, when the excitation light E outputted from the light emitters 56 enters the wavelength conversion member 50, the phosphor contained in the wavelength conversion member 50 is excited, and the fluorescence Y emits from arbitrary light emission points. The fluorescence Y travels omnidirectionally from the arbitrary light emission points, and the fluorescence Y traveling toward the side surfaces 50g travels toward the first surface 50a or the second surface 50b while repeatedly totally reflected off the side surfaces 50g at a plurality of locations. The fluorescence Y traveling toward the first surface 50a enters the output section 54. On the other hand, the fluorescence Y traveling toward the second surface 50b is reflected off the reflection member 53 and then travels toward the first surface 50a.

Out of the excitation light E having entered the wavelength conversion member 50, a portion of the excitation light E, the portion not having been used to excite the phosphor, is reflected off members around the wavelength conversion member 50, including the light emitters 56 of the light source section 51, or the reflection member 53 provided at the second surface 50b. The portion of the excitation light E is therefore confined in the wavelength conversion member 50 and reused.

The output section 54 is provided along the center axis J of the wavelength conversion member 50. The output section 54 outputs the fluorescence Y generated by the wavelength conversion member 50. In the present embodiment, the wavelength conversion member 50 and the output section 54 are integrated into a single member. The output section 54 therefore contains the YAG-based phosphor, as the wavelength conversion member 50 does.

The output section 54 includes a first end section 54a, a second end section 54b, and a tapering section 54c. The first end section 54a faces the first surface 50a of the wavelength conversion member 50. The second end section 54b is located at the side opposite from the first end section 54a along the center axis J. The tapering section 54c is a section having a cross-sectional area that is perpendicular to the center axis J and gradually decreases from the first end section 54a toward the second end section 54b. The tapering section 54c has light output surfaces 54d, which incline with respect to the center axis J and via which the fluorescence Y exits. In the present embodiment, the entire section between the first end section 54a and the second end section 54b forms the tapering section 54c. The configuration described above is preferable, but at least part of the section between the first end section 54a and the second end section 54b may form the tapering section 54c.

In the present embodiment, the output section 54 has a quadrangular pyramidal shape, as shown in FIG. 3. The output section 54 therefore has four light output surfaces 54d. The light output surfaces 54d each have a triangular shape having one side in contact with the corresponding one of the side surfaces 50g of the wavelength conversion member 50. The first end section 54a has a square shape when viewed in the direction parallel to the center axis J. The second end section 54b, where the vertices of the four light output surfaces 54d are in contact with one another at a single point, has a pointed shape. The output section 54 is formed, for example, by grinding the end of the wavelength conversion member 50 having a quadrangular columnar shape into a quadrangular pyramidal shape.

Let H be the dimension, of the output section 54, extending along the direction parallel to the center axis J (axis-X direction), and L be the dimension, of the first end section 54a, extending along the directions perpendicular to the center axis J (axis-Y and axis-Z directions), that is, the length of each side of the square that forms the outer shape of the first end section 54a. Under the definition described above, a dimension ratio H/L is greater than 0.5. That is, the relationship H/L>0.5 is satisfied. The dimension ratio H/L is preferably smaller than or equal to 5, more preferably, ranges from 2 to 3.

The light collection member 52 is provided so as to cover the four light output surfaces 54d of the output section 54. The light collection member 52 reflects the fluorescence Y outputted from the output section 54 and changes the traveling direction of the fluorescence Y from a direction away from the center axis J to a direction closer to the center axis J.

The light collection member 52 is formed in a tubular shape having a hollow interior and has a truncated quadrangular pyramidal outer shape. The light collection member 52 has a third end section 52a, which is relatively close to the wavelength conversion member 50 (–X side), a fourth end section 52b, which is located at the side opposite from the third end section 52a (+X side), and reflection surfaces 52r. The reflection surfaces 52r face the internal space of the tubular light collection member 52. That is, the reflection surfaces 52r face the light output surfaces 54d of the output section 54 and reflect the fluorescence Y outputted from the output section 54.

In the present embodiment, the third end section 52a of the light collection member 52 is in contact with the output section 54 and the wavelength conversion member 50. Note that the third end section 52a of the light collection member 52 may not necessarily be in contact with the output section 54 or the wavelength conversion member 50. The reflection surfaces 52r of the light collection member 52 are separate from the light output surfaces 54d of the output section 54. That is, a space S (air) is present between the reflection surfaces 52r of the light collection member 52 and the light output surfaces 54d of the output section 54. Note that the entire reflection surfaces 52r of the light collection member 52 may not be separate from the light output surfaces 54d of the output section 54, and that at least a portion of the reflection surfaces 52r of the light collection member 52, the portion facing the fourth end section 52b, may be separate from the light output surfaces 54d at the side facing the second end section 54b of the output section 54.

The space S between the reflection surfaces 52r of the light collection member 52 and the light output surfaces 54d of the output section 54 has a cross-sectional area perpendicular to the center axis J and gradually increasing from the third end section 52a toward the fourth end section 52b. In other words, in the direction perpendicular to the center axis J, the gap between the light collection member 52 and the center axis J gradually increases from the third end section 52a toward the fourth end section 52b. The thus shaped light collection member 52 can be produced by attaching four trapezoidal reflection plates to each other with reflection surfaces thereof facing inward. Each of the reflection plates may be formed, for example, of a glass plate with a dielectric multilayer film or a metal film formed at one surface of the plate, or may be formed of a metal plate.

In the direction parallel to the center axis J (axis-X direction), a distance K between the first surface 50a of the wavelength conversion member 50 and the fourth end section 52b of the light collection member 52 is greater than or equal to the distance between the first surface 50a of the wavelength conversion member 50 and the second end section 54b of the output section 54 (dimension H), as shown in FIG. 2. In other words, the length of the light collection member 52 in the direction parallel to the center axis J (axis-X direction) is greater than or equal to the length of the output section 54 in the direction parallel to the center axis J (axis-X direction). The second end section 54b of the output section 54 therefore does not protrude toward the +X side beyond the fourth end section 52b of the light collection member 52.

Figure 4:
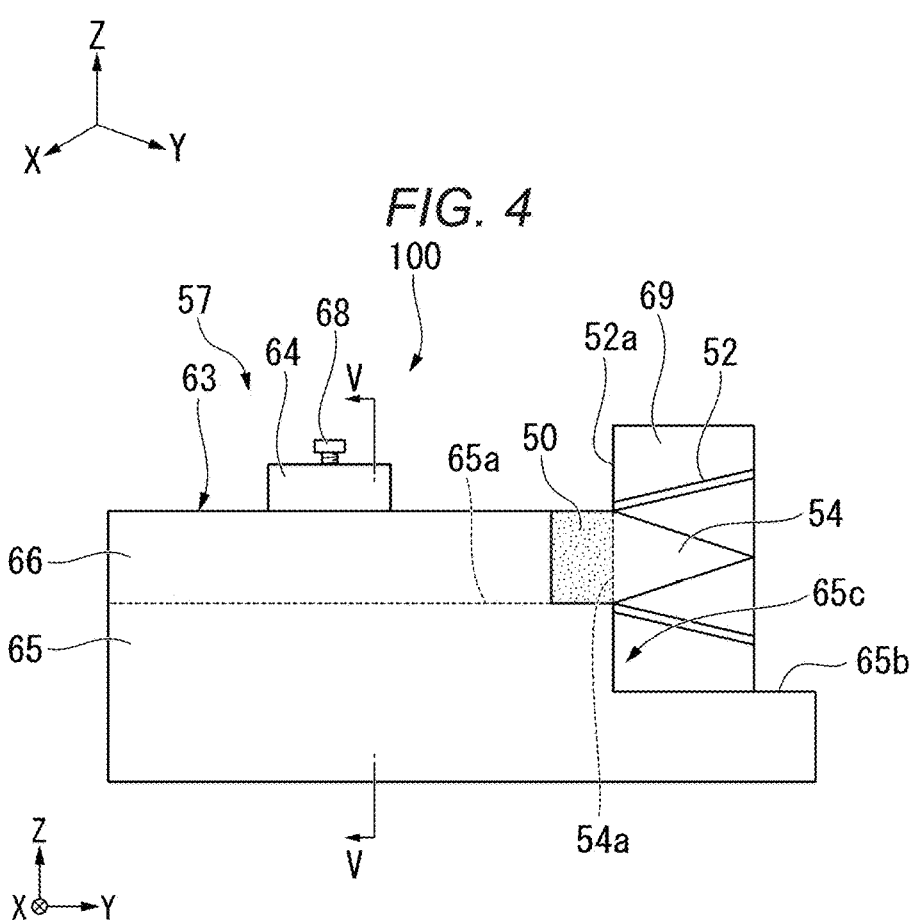
FIG. 4 is a side view of the light source apparatus.
Figure 5:
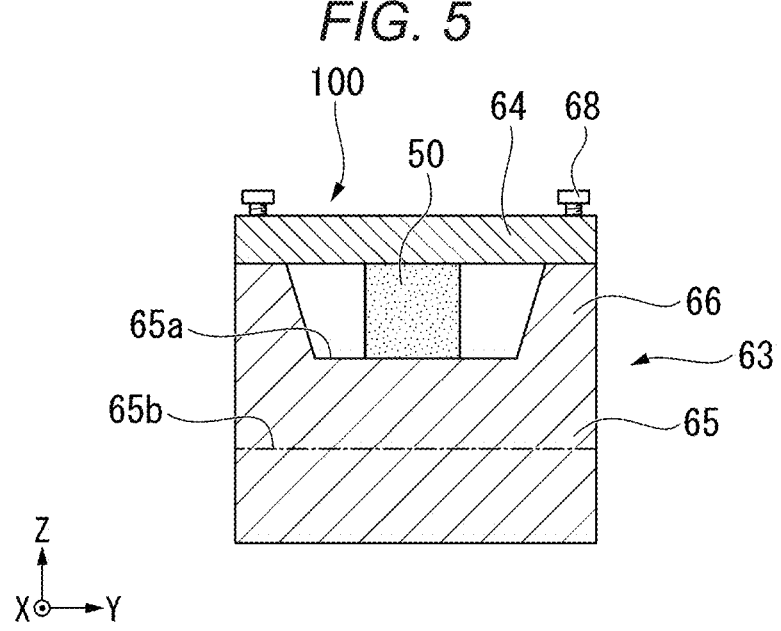
FIG. 5 is a cross-sectional view of the light source apparatus taken along the line V-V in FIG. 4.

FIG. 4 is a side view of the light source apparatus 100. FIG. 5 is a cross-sectional view of the light source apparatus 100 taken along the line V-V in FIG. 4.

The light source apparatus 100 includes the support member 57, which supports the wavelength conversion member 50 and the light collection member 52, as shown in FIGS. 4 and 5. The support member 57 is formed of a base 63 and a pressing plate 64. The base 63 includes a base section 65 and two wall sections 66. The base section 65 includes a stepped section 65c, an upper section 65a, which is located above the stepped section 65c, and a lower section 65b, which is located below the stepped section 65c. The wall sections 66 protrude upward from the upper section 65a of the base section 65.

The wavelength conversion member 50 is fixed to the upper section 65a of the base 63 being sandwiched between the base 63 and the pressing plate 64. The pressing plate 64 extends between the two wall sections 66 and is fixed to the base 63 with screws 68. The light collection member 52 is fixed to the lower section 65b of the base 63 being fit into a fixing jig 69. In the configuration described above, the output section 54 and the light collection member 52 are so positioned that the position of the first end section 54a and the position of the third end section 52a coincide with each other in the axis-X direction.

The light collection lens 104 is provided so as to face a fourth end section 52b of a light collection member 52, as shown in FIG. 2. The light collection lens 104 parallelizes the fluorescence Y having exited out of the light collection member 52. That is, the light collection lens 104 further increases the parallelism of the fluorescence Y having an angle distribution converted by the light collection member 52. The light collection lens 104 is formed of a convex lens. When sufficient parallelism is achieved only by the light collection member 52, the light collection lens 104 may be omitted as required.

The optical integration system 70 includes a first lens array 61 and a second lens array 101. The optical integration system 70, along with the superimposing system 103, forms an illumination homogenizing system that homogenizes the intensity distribution of the fluorescence Y outputted from the light source apparatus 100 at each of the light modulators 4R and 4G, which are illumination receiving regions. The fluorescence Y having exited out of the light collection member 52 enters the first lens array 61. The first lens array 61, along with the second lens array 101 provided in a position downstream from the light source apparatus 100, forms the optical integration system 70.

The first lens array 61 includes a plurality of first lenslets 61a. The plurality of first lenslets 61a are arranged in a matrix in a plane parallel to the plane YZ perpendicular to the optical axis AX1 of the first illuminator 20. The plurality of first lenslets 61a divide the fluorescence Y having exited out of the light collection member 52 into a plurality of sub-luminous fluxes. The first lenslets 61a each have a rectangular shape substantially similar to the shape of the image formation region of each of the optical modulators 4R and 4G. The sub-luminous fluxes having exited out of the first lens array 61 are thus each efficiently incident on the image formation region of each of the light modulators 4R and 4G.

The fluorescence Y having exited out of the first lens array 61 travels toward the second lens array 101. The second lens array 101 is disposed so as to face the first lens array 61. The second lens array 101 includes a plurality of second lenslets 101a corresponding to the plurality of first lenslets 61a of the first lens array 61. The second lens array 101 along with the superimposing system 103 brings images of the plurality of first lenslets 61a of the first lens array 61 into focus in the vicinity of the image formation region of each of the light modulators 4R and 4G. The plurality of second lenslets 101a are arranged in a matrix in a plane parallel to the plane YZ perpendicular to the optical axis AX1 of the first illuminator 20.

In the present embodiment, the first lenslets 61a of the first lens array 61 and the second lenslets 101a of the second lens array 101 have the same size, and may instead have sizes different from each other. In the present embodiment, the first lenslets 61a of the first lens array 61 and the second lenslets 101a of the second lens array 101 are so disposed that the optical axes thereof coincide with each other, and may instead be so disposed that the optical axes thereof deviate from each other.

The polarization converter 102 converts the polarization direction of the fluorescence Y having exited out of the second lens array 101. Specifically, the polarization converter 102 converts sub-luminous fluxes of the fluorescence Y into which the first lens array 61 divides the fluorescence Y and which exit out of the second lens array 101 into linearly polarized luminous fluxes.

The polarization converter 102 includes polarization separation layers (not shown) that directly transmit one of linearly polarized light components contained in the fluorescence Y outputted from the light source apparatus 100 and reflect another one of the linearly polarized light components in a direction perpendicular to the optical axis AX1, reflection layers (not shown) that reflect the other linearly polarized light component reflected off the polarization separation layers in the direction parallel to the optical axis AX1, and retardation films (not shown) that convert the other linearly polarized light component reflected off the reflection layers into the one linearly polarized light component.

Comparable Example

A light source apparatus according to Comparable Example will be descried below.

To examine the effects of the light source apparatus according to the present embodiment, the present inventor has assumed a light source apparatus according to Comparative Example shown below and conducted a simulation on fluorescence extraction efficiency.

Figure 6:
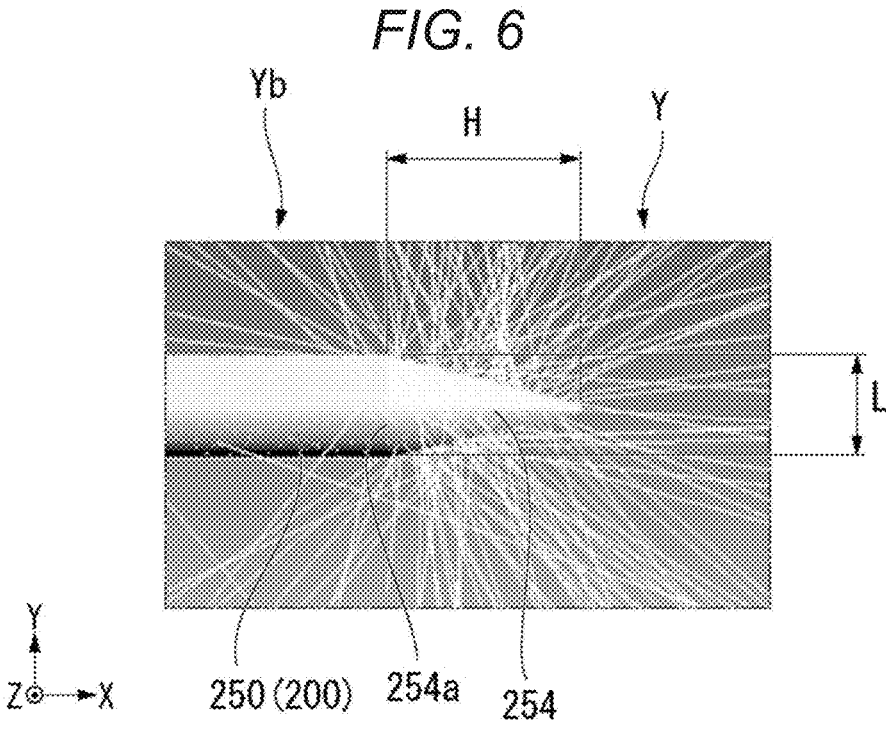
FIG. 6 shows the direction in which fluorescence exits in the light source apparatus according to Comparative Example.

FIG. 6 shows the result of the simulation showing the direction in which the fluorescence Y exits in a light source apparatus 200 according to Comparative Example.

The light source apparatus 200 according to Comparative Example includes a wavelength conversion member 250 and an output section 254 provided at one end of the wavelength conversion member 250, but does not include the light collection member 52 in the present embodiment, as shown in FIG. 6. FIG. 6 shows that the configuration in which the output section 254, which has a pyramidal shape, is provided at one end of the wavelength conversion member 250 allows the output section 254 to output a large amount of fluorescence Y. In the following description of the present specification, the direction from the first end section toward the second end section of the output section (direction +X) is referred to as a forward direction, and the direction from the second end section toward the first end section (direction −X) is referred to as a rearward direction.

In the configuration in which the output section 254 having a pyramidal shape is provided at one end of the wavelength conversion member 250, a large portion of the fluorescence Y is extracted out of the output section 254. In this case, however, fluorescence Yb, which is part of the fluorescence Y, is extracted in the rearward direction although it is intrinsically desired to extract the fluorescence Y in the frontward direction from the output section 254.

The present inventor then examined changes in the extraction efficiency that occur when the dimensions of the output section 254 are changed in the light source apparatus 200 according to Comparative Example.

Figure 7:
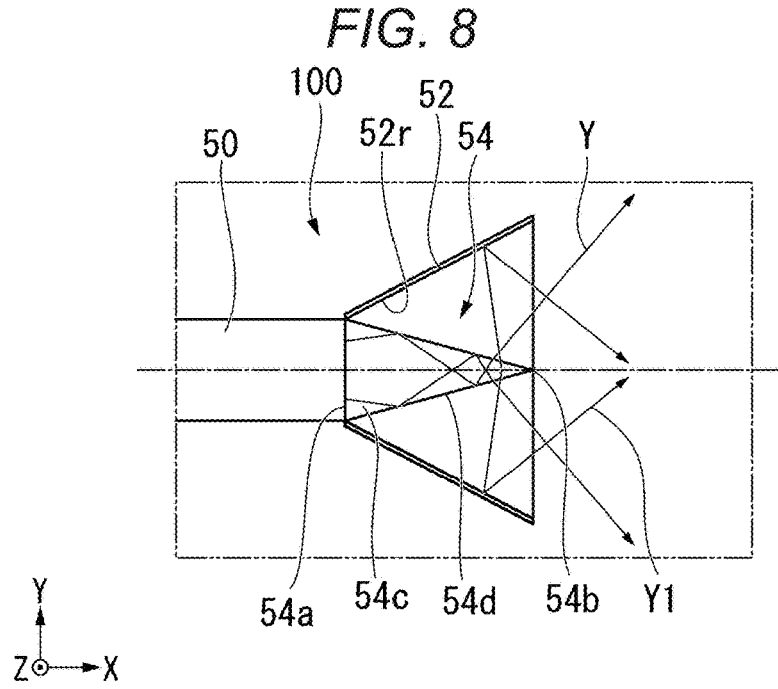
FIG. 7 is a graph showing the relationship between the dimension in axis-X direction of an output section and extraction efficiency.

FIG. 7 is a graph showing the relationship between the length (dimension in axis-X direction) of the output section 254 and the extraction efficiency. The horizontal axis of FIG. 7 represents the length (dimension in axis-X direction) [mm] of the output section 254. The vertical axis of FIG. 7 represents the extraction efficiency [%]. In the simulation, the width L of the output section 254 (dimensions in axis-Y and axis-Z directions) was set at 1 mm, and a hemispherical light receiver that covers the front side of the output section 254 was set around the center of a first end section 254a of the output section 254, followed by calculation of the extraction efficiency. In this case, since the fluorescence Yb extracted rearward from the output section 254 is not incident on the light receiver, the extraction efficiency on the vertical axis of FIG. 7 is calculated by substituting the amount of fluorescence Y extracted forward and sideways from the output section 254, instead of the amount of fluorescence extracted from the output section 254 in all directions, into the numerator of the dimension ratio H/L, and substituting the total amount of fluorescence Y generated by the wavelength conversion member 250 into the denominator of the dimension ratio.

When the length of the output section 254 is gradually increased from 0, the extraction efficiency tends to sharply increase until the length reaches about 0.5 mm, as shown in FIG. 7. When the length of the output section 254 exceeds 0.5 mm, however, the extraction efficiency becomes almost constant at a value of about 45%. A first conceivable reason for this is that when the length of the output section 254 ranges from 0 to 0.5 mm, in the wavelength conversion member 250, the amount of light outputted from the output section 254 is small in the first place due, for example, to light leakage via the side surfaces 50g of the wavelength conversion member 250. A second conceivable reason is that even when an increase in the length of the output section 254 beyond 0.5 mm increases the amount of fluorescence Y that can be extracted out of the output section 254, the fluorescence Yb extracted rearward from the output section 254 increases accordingly, so that the extraction efficiency at which the fluorescence Y is extracted forward and sideways hardly increases.

As described above, in the light source apparatus 200 according to Comparative Example, the presence of the fluorescence Yb extracted rearward from the output section 254 causes a problem of low fluorescence utilization efficiency in the optical system located at a position downstream from the light source apparatus 200 in the case where the light source apparatus 200 is used in an optical instrument.

Effects of First Embodiment

The light source apparatus 100 according to the present embodiment includes the light emitters 56, which output the excitation light E having the first wavelength band, the wavelength conversion member 50 containing a phosphor, which converts the excitation light E outputted from the light emitters 56 into the fluorescence Y having the second wavelength band, the output section 54, which is provided along the center axis J of the wavelength conversion member 50 and outputs the fluorescence Y generated by the wavelength conversion member 50, and the light collection member 52, which reflects the fluorescence Y outputted from the output section 54 to change the traveling direction of the fluorescence Y from a direction away from the center axis J to a direction close to the center axis J. The output section 54 includes the first end section 54a, which faces the wavelength conversion member 50, the second end section 54b, which is located at the side opposite from the first end section 54a along the center axis J, and the tapering section 54c, which has a cross-sectional area perpendicular to the center axis J and gradually decreasing from the first end section 54a toward the second end section 54b, and the tapering section 54c has the light output surfaces 54d, which incline with respect to the center axis J and via which the fluorescence Y exits. The light collection member 52 includes the third end section 52a, which is relatively close to the wavelength conversion member 50, the fourth end section 52b, which is located at the side opposite from the third end section 52a, and the reflection surfaces 52r, which face the light output surfaces 54d and reflect the fluorescence Y. At least a portion of the reflection surface 52r of the light collection member 52, the portion facing the fourth end section 52b, is separate from the light output surfaces 54d at the side facing the second end section 54b of the output section 54.

Figure 8:
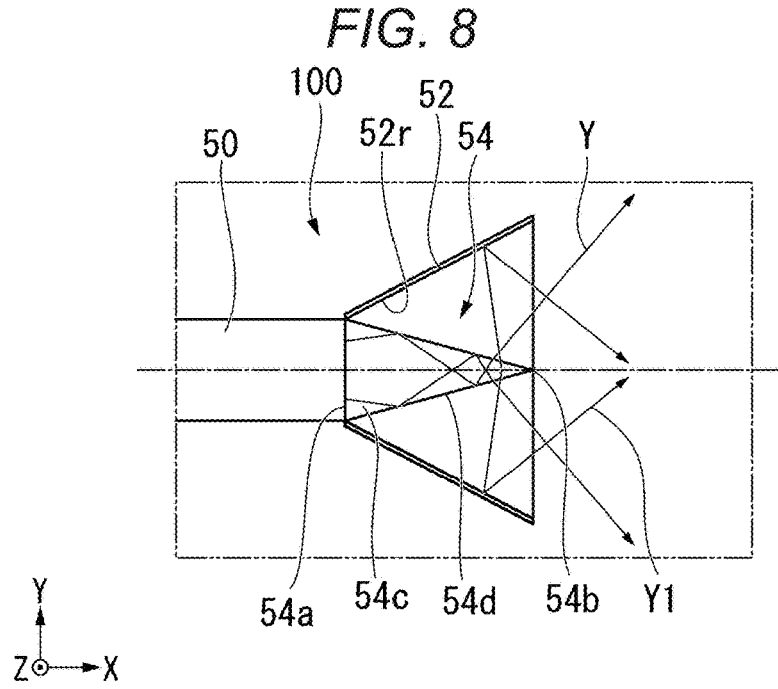
FIG. 8 describes the behavior of the fluorescence outputted from a wavelength conversion member.

FIG. 8 describes the behavior of the fluorescence Y outputted from the output section 54.

Since the light source apparatus 100 according to the present embodiment is provided with the output section 54, which includes the tapering section 54c having a cross-sectional area perpendicular to the center axis J and gradually decreasing from the first end section 54a toward the second end section 54b, the fluorescence Y having entered the output section 54 from the wavelength conversion member 50 changes in such a way that the angle of incidence thereof incident on the light output surfaces 54d decreases whenever the fluorescence Y undergoes the internal total reflection at the light output surfaces 54d, as shown in FIG. 8. Therefore, in the example shown in FIG. 8, the angle of incidence of the fluorescence Y is greater than or equal to the critical angle until the number of total reflection actions reaches two so that the fluorescence Y is totally reflected off the light output surfaces 54d within the output section 54, but the angle of incidence of the fluorescence Y is smaller than the critical angle when the number of total reflection actions reaches three so that the fluorescence Y exits via the light output surfaces 54d.

However, when outputted via the light output surfaces 54d, a portion of the fluorescence Y shown in FIG. 8 travels toward the rear of the output section 54 (−X side) and is then extracted, the portion cannot be used by a downstream optical system in the light source apparatus 200 according to Comparable Example. In contrast, the light source apparatus 100 according to the present embodiment includes the light collection member 52, which reflects the fluorescence Y to change the traveling direction of the fluorescence Y from the direction away from the center axis J to the direction close to the center axis J. Furthermore, the reflection surfaces 52r of the light collection member 52 are separate from the light output surfaces 54d of the output section 54, so that the space S is present between the reflection surfaces 52r and the light output surfaces 54d. According to the configuration described above, fluorescence Y1 traveling toward the rear of the output section 54 (−X side) and then extracted is reflected off the reflection surfaces 52r of the light collection member 52 and travels toward the front of the output section 54 (+X side). The fluorescence Y1 can therefore be used by a downstream optical system of the light source apparatus 100, whereby the light source apparatus 100 that excels in the efficiency of utilization of the fluorescence Y can be achieved.

In the light source apparatus 100 according to the present embodiment, the gap in the direction perpendicular to the center axis J between the light collection member 52 and the center axis J gradually increases from the third end section 52a toward the fourth end section 52b. In other words, the light collection member 52 has a shape that gradually widens from the rear of the output section 54 toward the front thereof.

According to the configuration described above, in which the fluorescence Y outputted via the light output surfaces 54d of the output section 54 is reflected off the reflection surfaces 52r of the light collection member 52, the radiation angle distribution of the fluorescence Y is narrowed. The light utilization efficiency of a downstream optical system of the light source apparatus 100 can thus be increased.

Figure 9:
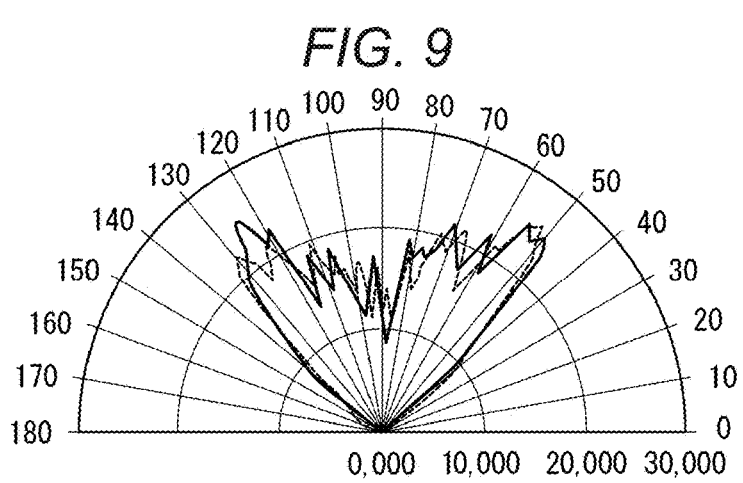
FIG. 9 shows a radiation angle distribution of the fluorescence outputted from a light collection member.

FIG. 9 shows the result of the simulation conducted by the present inventor and shows the radiation angle distribution of the fluorescence Y outputted from the light collection member 52. The solid line shown in FIG. 9 represents the radiation angle distribution when viewed toward the positive side of the axis X (toward output side along center axis J) and viewed along the axis Z from the positive side toward the negative side. The broken line in FIG. 9 represents the radiation angle distribution when viewed toward the positive side of the axis X and viewed along the axis Y from the positive side toward the negative side. As for the polar angle shown in FIG. 9, the direction representing 90° corresponds to the direction along the center axis J of the wavelength conversion member 50. The unit of the numerals shown along the horizontal axis of FIG. 9 is a certain radiation intensity (mW/sr), which is a physical quantity representing the energy radiated per time from a radiation source in a certain direction. The absolute value on the horizontal axis (30,000, for example) itself is a relative indicator having no particular meaning.

In the light source apparatus 200 according to Comparative Example, which includes no light collection member, the fluorescence Yb is outputted also rearward from the output section 254, so that the fluorescence Y has a radiation angle distribution greater than ±90°. In contrast, the light source apparatus 100 according to the present embodiment, which is provided with the light collection member 52 having a shape gradually widening from the rear toward the front of the output section 54, can suppress the radiation angle distribution of the fluorescence Y to about ±40°, as shown in FIG. 9.

In the light source apparatus 100 according to the present embodiment, the output section 54 has a quadrangular pyramidal shape.

According to the configuration described above, the output section 54 can be readily formed at the end of the wavelength conversion member 50 having a quadrangular columnar shape.

In the light source apparatus 100 according to the present embodiment, the dimension ratio H/L of the output section 54 is greater than 0.5.

As can be estimated from the simulation result shown in FIG. 7, in the region where the dimensional ratio H/L of the output section 54 is smaller than or equal to 0.5, a large amount of fluorescence Y undergoes internal total reflection at the light output surfaces 54d of the output section 54, and there is room for further improvement in the efficiency at which the fluorescence Y is extracted. In contrast, when the dimensional ratio H/L of the output section 54 is set at a value in the region where the dimensional ratio H/L exceeds 0.5, the efficiency at which the fluorescence Y is extracted from the output section 54 can be stably secured.

In the light source apparatus 100 according to the present embodiment, the wavelength conversion member 50 and the light output section 54 are integrated with each other into a single member.

According to the configuration described above, the output section 54 can be readily formed by using a phosphor polishing process or any other approach in the process of manufacturing the light source apparatus 100.

When the amount of fluorescence Y to be extracted from the output section 54 does not have to be so large, the output section 54 may be formed of a translucent member separate from the wavelength conversion member 50 and may be bonded to the wavelength conversion member 50. According to the configuration described above, the output section 54 can be produced separately from the wavelength conversion member 50 by a press working or any other approach using a die, whereby the phosphor polishing process can be omitted.

In the light source apparatus 100 according to the present embodiment, the distance K between the wavelength conversion member 50 and the fourth end section 52b of the light collection member 52 in the direction parallel to the center axis J is greater than or equal to the distance between the wavelength conversion member 50 and the second end section 54b of the output section 54.

When the distance K between the wavelength conversion member 50 and the fourth end section 52b of the light collection member 52 in the direction parallel to the center axis J is smaller than the distance between the wavelength conversion member 50 and the second end section 54b of the output section 54 (dimension H), a portion of the output section 54, the portion facing the second end section 54b, protrudes forward beyond the light collection member 52, so that there is a slight amount of fluorescence Yb that is not incident on the light collection member 52 but travels rearward from the output section 54 and is then extracted. In contrast, according to the configuration in the present embodiment, the output section 54 does not protrude forward beyond the light collection member 52, whereby the fluorescence Yb that is not incident on the light collection member 52 but travels rearward from the output section 54 and is then extracted can be suppressed.

The light source apparatus 100 according to the present embodiment further includes the support member 57, which supports the wavelength conversion member 50 and the light collection member 52.

According to the configuration described above, the support member 57 can collectively support the wavelength conversion member 50 and the light collection member 52, and can readily position the output section 54 and the light collection member 52 with respect to each other.

The projector 1 according to the present embodiment, which includes the light source apparatus 100 according to the present embodiment, excels in the light utilization efficiency.

Second Embodiment

A second embodiment of the present disclosure will be described below with reference to FIG. 10.

The basic configurations of the projector and light source apparatus according to the second embodiment are the same as those in the first embodiment and will therefore not be described.

Figure 10:
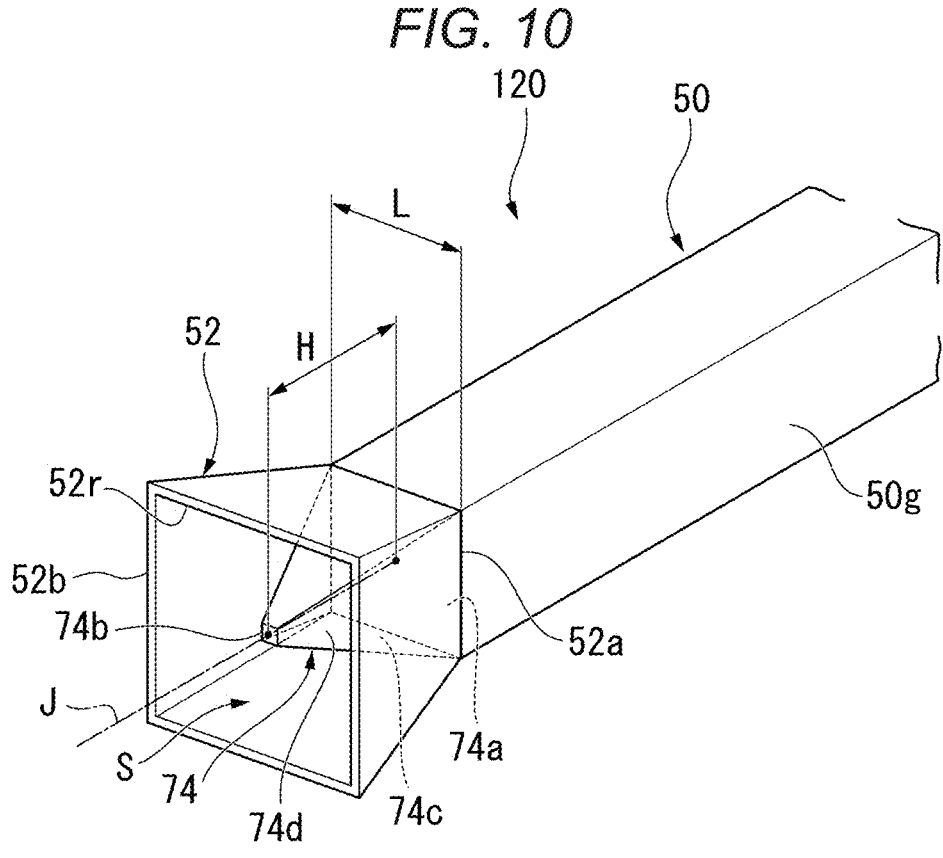
FIG. 10 is a perspective view of key parts of the light source apparatus according to a second embodiment.

FIG. 10 is a perspective view of key parts of a light source apparatus 120 according to the second embodiment.

In FIG. 10, components common to those in the figures used in the first embodiment have the same reference characters and will not be described.

The light source apparatus 120 according to the present embodiment includes the wavelength conversion member 50, a light source section (not shown), a reflection member (not shown), an output section 74, the light collection member 52, and a holding member (not shown), as shown in FIG. 10.

In the present embodiment, the output section 74 has a truncated quadrangular pyramidal shape. The output section 74 therefore has four light output surfaces 74d. The light output surfaces 74d each have a trapezoidal shape having a bottom side in contact with the corresponding side surface 50g of the wavelength conversion member 50. A first end section 74a has a square shape when viewed in the direction parallel to the center axis J. A second end section 74b has a flat surface that intersects with the center axis J. The flat surface has a square shape when viewed in the direction parallel to the center axis J and has an area smaller than the area of the square first end section 74a. A tapering section 74c has a cross-sectional area that is perpendicular to the center axis J and gradually decreases from the first end section 74a toward the second end section 74b. The output section 74 may be integrated with the wavelength conversion member 50 into a single member or may be formed of a member separate from the wavelength conversion member 50. The other configurations of the light source apparatus 120 are the same as those in the first embodiment.

Effects of Second Embodiment

The present embodiment also provides the same effects as those provided by the first embodiment, for example, the light source apparatus 120 that excels in the efficiency of utilization of the fluorescence Y can be achieved.

In the light source apparatus 120 according to the present embodiment, the output section 74 has a truncated pyramidal shape, and the second end section 74b has a flat surface that intersects with the center axis J.

According to the configuration described above, in which the second end section 74b of the output section 74 is not thin or pointed, the risk of damage to the second end section 74b can be reduced, for example, during the process of manufacturing the light source apparatus 120. In addition, since the fluorescence Y hardly reaches the second end section 74b of the output section 74, the configuration in which the second end section 74b has a planar shape hardly causes a risk of decrease in the extraction efficiency. In place of the configuration in the present embodiment, the second end section of the output section may be rounded into a curved shape.

Third Embodiment

A third embodiment of the present disclosure will be described below with reference to FIG. 11.

The basic configurations of the projector and light source apparatus according to the third embodiment are the same as those in the first embodiment and will therefore not be described.

Figure 11:
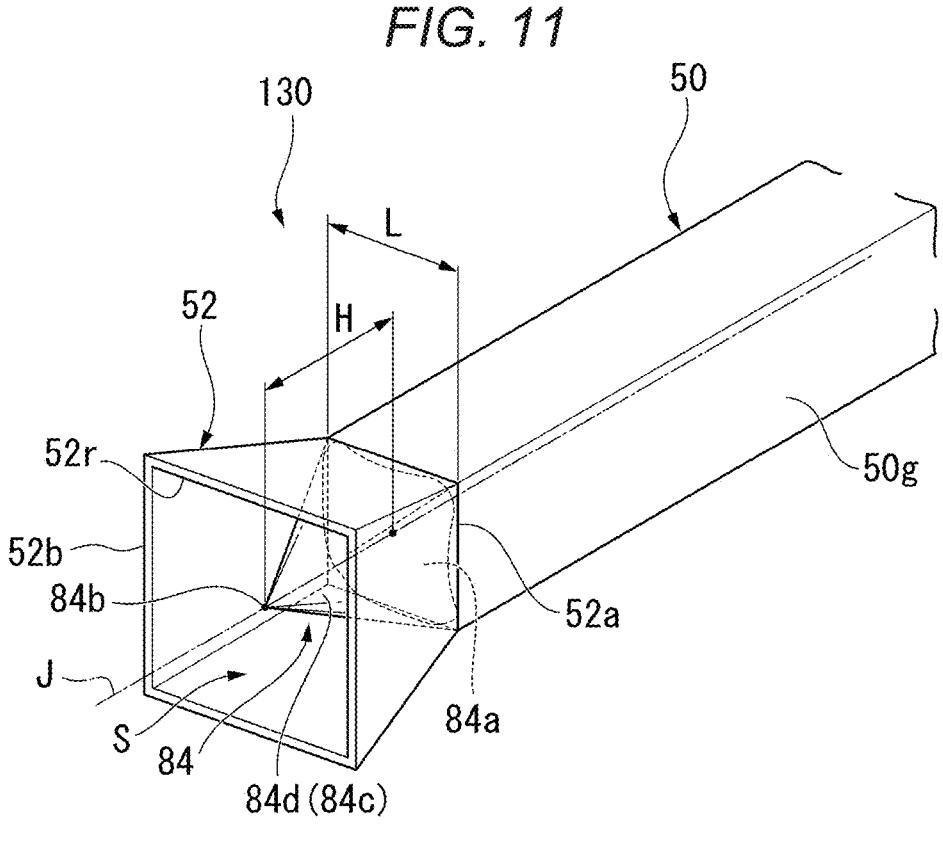
FIG. 11 is a perspective view of key parts of the light source apparatus according to a third embodiment.

FIG. 11 is a perspective view of key parts of a light source apparatus 130 according to the third embodiment.

In FIG. 11, components common to those in the figures used in the first embodiment have the same reference characters and will not be described.

The light source apparatus 130 according to the present embodiment includes the wavelength conversion member 50, a light source section (not shown), a reflection member (not shown), an output section 84, the light collection member 52, and a holding member (not shown), as shown in FIG. 11.

In the present embodiment, the output section 84 has a conical shape. The output section 84 therefore has one curved light output surface 84d. A second end section 84b has a pointed shape. A tapering section 84c has a circular cross-sectional shape perpendicular to the center axis J and has a cross-sectional area perpendicular to the center axis J gradually decreasing from a first end section 84a toward the second end section 84b. Note that the output section 84 may have a truncated conical shape with the second end section 84b formed of a flat surface, or may have a conical shape with the second end section 84b rounded. The output section 84 may be integrated with the wavelength conversion member 50 into a single member or may be formed of a member separate from the wavelength conversion member 50. The other configurations of the light source apparatus 130 are the same as those in the first embodiment.

Effects of Third Embodiment

The present embodiment also provides the same effects as those provided by the first embodiment, for example, the light source apparatus 130 that excels in the efficiency of utilization of the fluorescence Y can be achieved.

In the light source apparatus 130 according to the present embodiment, the output section 84 has a conical shape.

When the output section is viewed in the direction parallel to the center axis J (axis-X direction), there is no difference, caused by the shape of the output section, in the efficiency of extraction of the fluorescence Y that travels in the direction parallel to the axis-Y or axis-Z direction. In contrast, the shape of the output section affects the efficiency of extraction of the fluorescence Y that travels in the directions that intersect with the axis-Y and axis-Z directions.

Specifically, when the output section 54 has a quadrangular pyramidal shape, as in the first embodiment, and is viewed in the direction parallel to the center axis J (axis-X direction), the internal total reflection conditions in the plane YZ are likely to be maintained for the fluorescence Y that travels in directions that intersect with the axis-Y and axis-Z directions, so that the fluorescence Y incident on the light output surfaces 54*d* is unlikely to exit via the light output surfaces 54*d*, and the number of reflection actions is likely to increase. In contrast, when the output section 84 has a conical shape, as in the present embodiment, and is viewed in the direction parallel to the center axis J (axis-X direction), the angle of incidence of the fluorescence Y that travels in the directions that intersect with the axis-Y and axis-Z directions and is incident on the light output surface 84*d* is likely to change in the plane YZ and become smaller than the critical angle. The fluorescence Y incident on the light output surface 84*d* therefore tends to be outputted after a small number of reflection actions, resulting in a small amount of attenuation of the fluorescence Y. As a result, the light source apparatus 130 according to the present embodiment allows an increase in the extraction efficiency as compared with the case where the output section has a quadrangular pyramidal shape.

The technical scope of the present disclosure is not limited to the embodiments described above, and a variety of changes can be made thereto to the extent that the changes do not depart from the intent of the present disclosure. An aspect of the present disclosure can be an appropriate combination of the characteristic portions of the embodiments described above.

The embodiments described above show the case where the output section has a quadrangular pyramidal shape, a truncated quadrangular pyramidal shape, and a conical shape, and may instead have a polygonal pyramidal shape or a truncated polygonal pyramidal shape other than a quadrangular pyramidal shape. Since the output section having a conical shape is superior to the output section having a quadrangular conical shape in terms of extraction efficiency, as described in the third embodiment, the output section may have a polygonal pyramidal shape or a truncated polygonal pyramidal shape having four or more light output surfaces. A larger number of light output surfaces cause the behavior of the fluorescence to be closer to the behavior achieved by the output section having a conical shape. When the output section has a polygonal pyramidal shape or a truncated polygonal pyramidal shape having an odd number of light output surfaces, the angular distribution of the outputted fluorescence is asymmetric with respect to the center axis, and it is therefore preferable from the viewpoint of symmetry of the angular distribution of the fluorescence that the output section has a polygonal pyramidal shape or a truncated polygonal pyramidal shape having an even number of light output surfaces. However, since a larger number of light output surfaces make it more difficult to process the output section, a quadrangular pyramidal shape, a truncated quadrangular pyramidal shape, a conical shape, a truncated conical shape, or any other similar shape is preferred from the viewpoint of ease of processing.

In addition, the specific descriptions of the shape, the number, the arrangement, the material, and other factors of each of the components of the light source apparatus and the projector are not limited to those in the embodiments described above and can be changed as appropriate. The above embodiments have been described with reference to the case where the light source apparatuses according to the present disclosure are each incorporated in a projector using liquid crystal panels, but not necessarily. The light source apparatuses according to the present disclosure may each be incorporated in a projector using a digital micromirror device as each of the light modulators. The projector may not include a plurality of light modulators and may instead include only one light modulator.

The above embodiments have been described with reference to the case where the light source apparatuses according to the present disclosure are each incorporated in a projector, but not necessarily. The light source apparatuses according to the present disclosure may each be used as a lighting apparatus, a headlight of an automobile, and other components.

A light source apparatus according to an aspect of the present disclosure may have the configuration below.

The light source apparatus according to the aspect of the present disclosure includes a light emitter that outputs first light having a first wavelength band, a wavelength conversion member that includes a phosphor and converts the first light outputted from the light emitter into second light having a second wavelength band different from the first wavelength band, an output section that is provided along the center axis of the wavelength conversion member and outputs the second light generated by the wavelength conversion member, and a light collection member that reflects the second light outputted from the output section to change the traveling direction of the second light from a direction away from the center axis to a direction close to the center axis. The output section includes a first end section that faces the wavelength conversion member, a second end section that is located at the side opposite from the first end section along the center axis, and a tapering section that has a cross-sectional area that is perpendicular to the center axis and gradually decreases from the first end section toward the second end section, and the tapering section has a light output surface which inclines with respect to the center axis and via which the second light exits. The light collection member includes a third end section that is relatively close to the wavelength conversion member, a fourth end section that is located at the side opposite from the third end section, and a reflection surface that faces the light output surface and reflects the second light. At least a portion of the reflection surface of the light collection member, the portion facing the fourth end section, is separate from the light output surface at the side facing the second end section of the output section.

In the light source apparatus according to the aspect of the present disclosure, the gap between the light collection member and the center axis in a direction perpendicular to the center axis may gradually increase from the third end section toward the fourth end section.

In the light source apparatus according to the aspect of the present disclosure, the output section may have a pyramidal shape.

In the light source apparatus according to the aspect of the present disclosure, the output section may have a truncated pyramidal shape, and the second end section may have a flat surface that intersects with the center axis.

In the light source apparatus according to the aspect of the present disclosure, the output section may have a conical shape or a truncated conical shape.

In the light source apparatus according to the aspect of the present disclosure, the ratio H/L of H to L may be greater than 0.5, where H represents the dimension of the output section along the direction parallel to the center axis, and L represents the dimension of the first end section along a direction perpendicular to the center axis.

In the light source apparatus according to the aspect of the present disclosure, the wavelength conversion member and the light output section may be integrated with each other into a single member.

In the light source apparatus according to the aspect of the present disclosure, the output section may be formed of a translucent member separate from the wavelength conversion member and may be bonded to the wavelength conversion member.

In the light source apparatus according to the aspect of the present disclosure, the distance between the wavelength conversion member and the fourth end section in the direction parallel to the center axis may be greater than or equal to the distance between the wavelength conversion member and the second end section.

The light source apparatus according to the aspect of the present disclosure may further include a support member that supports the wavelength conversion member and the light collection member.

A projector according to another aspect of the present disclosure may have the configuration below.

The projector according to the other aspect of the present disclosure includes the light source apparatus according to the aspect of the present disclosure, a light modulator that modulates light outputted from the light source apparatus and containing the second light in accordance with image information, and a projection optical apparatus that projects the light modulated by the light modulator.

What is claimed is:

1. A light source apparatus comprising:
a light emitter that outputs first light having a first wavelength band;
a wavelength converter that includes a phosphor and converts the first light outputted from the light emitter into second light having a second wavelength band different from the first wavelength band;
an output that is provided along a center axis of the wavelength converter and outputs the second light generated by the wavelength converter; and
a light converter that reflects the second light outputted from the output to change a traveling direction of the second light from a direction away from the center axis to a direction close to the center axis,
wherein the output section includes a first end section that faces the wavelength converter, a second end section that is located at a side opposite from the first end section along the center axis, and a tapering section that has a cross-sectional area that is perpendicular to the center axis and gradually decreases from the first end section toward the second end section,
the tapering section has a light output surface which inclines with respect to the center axis and via which the second light exits,
the light converter includes a third end section that is relatively close to the wavelength converter, a fourth end section that is located at a side opposite from the third end section, and a reflection surface that faces the light output surface and reflects the second light,
at least a portion of the reflection surface of the light converter, the portion facing the fourth end section, is separate from the light output surface at a side facing the second end section of the output,
the output has a pyramidal shape, and
a ratio H/L of H to L is greater than 0.5, where H represents a dimension of the output along a direction parallel to the center axis, and L represents a dimension of the first end section along a direction perpendicular to the center axis.

2. The light source apparatus according to claim 1, wherein a gap between the light converter and the center axis in a direction perpendicular to the center axis gradually increases from the third end section toward the fourth end section.

3. The light source apparatus according to claim 1, wherein the output section has a truncated pyramidal shape, and the second end section has a flat surface that intersects with the center axis.

4. The light source apparatus according to claim 1, wherein the output section has a conical shape or a truncated conical shape.

5. The light source apparatus according to claim 1, wherein the wavelength converter and the light output section are integrated with each other into a single member.

6. The light source apparatus according to claim 1, wherein the output is formed of a translucent member separate from the wavelength converter and bonded to the wavelength converter.

7. The light source apparatus according to claim 1, further comprising a support member that supports the wavelength converter and the light converter.

8. A projector comprising:
the light source apparatus according to claim 1;
a light modulator that modulates light outputted from the light source apparatus and containing the second light in accordance with image information; and
a projection optical apparatus that projects the light modulated by the light modulator.

9. A light source apparatus comprising:
a light emitter that outputs first light having a first wavelength band;
a wavelength converter that includes a phosphor and converts the first light outputted from the light emitter into second light having a second wavelength band different from the first wavelength band;
an output that is provided along a center axis of the wavelength converter and outputs the second light generated by the wavelength converter; and
a light collector that reflects the second light outputted from the output to change a traveling direction of the second light from a direction away from the center axis to a direction close to the center axis,
wherein the output includes a first end section that faces the wavelength converter, a second end section that is located at a side opposite from the first end section along the center axis, and a tapering section that has a cross-sectional area that is perpendicular to the center axis and gradually decreases from the first end section toward the second end section,
the tapering section has a light output surface which inclines with respect to the center axis and via which the second light exits,
the light collector includes a third end section that is relatively close to the wavelength converter, a fourth end section that is located at a side opposite from the third end section, and a reflection surface that faces the light output surface and reflects the second light,
at least a portion of the reflection surface of the light collector, the portion facing the fourth end section, is separate from the light output surface at a side facing the second end section of the output, and
a distance between the wavelength converter and the fourth end section in a direction parallel to the center axis is greater than or equal to a distance between the wavelength converter and the second end section.

10. The light source apparatus according to claim 9, wherein a gap between the light collector and the center axis in a direction perpendicular to the center axis gradually increases from the third end section toward the fourth end section.

11. The light source apparatus according to claim 9, wherein the output has a pyramidal shape.

12. The light source apparatus according to claim 11, wherein the output has a conical shape or a truncated conical shape.

13. The light source apparatus according to claim 11, wherein a ratio H/L of H to L is greater than 0.5, where H represents a dimension of the output along a direction parallel to the center axis, and L represents a dimension of the first end section along a direction perpendicular to the center axis.

14. The light source apparatus according to claim 9, wherein the output has a truncated pyramidal shape, and the second end section has a flat surface that intersects with the center axis.

15. The light source apparatus according to claim 9, wherein the wavelength converter and the light output are integrated with each other into a single member.

16. The light source apparatus according to claim 9, wherein the output is formed of a translucent member separate from the wavelength converter and bonded to the wavelength converter.

17. The light source apparatus according to claim 9, further comprising a support member that supports the wavelength converter and the light collector.

18. A projector comprising:

the light source apparatus according to claim 9;

a light modulator that modulates light outputted from the light source apparatus and containing the second light in accordance with image information; and a projection optical apparatus that projects the light modulated by the light modulator.

* * * * *